(12) United States Patent
Cavalli

(10) Patent No.: US 11,837,035 B2
(45) Date of Patent: Dec. 5, 2023

(54) MULTIFUNCTIONAL UNIT FOR THE ANALYSIS AND CALIBRATION OF DEVICES AND COMPONENTS OF A VEHICLE

(71) Applicant: TEXA S.p.A, Monastier di Treviso (IT)

(72) Inventor: Manuele Cavalli, Monastier di Treviso (IT)

(73) Assignee: Texa S.p.A, Monastier di Treviso (IT)

( * ) Notice: Subject to any disclaimer, the term of this patent is extended or adjusted under 35 U.S.C. 154(b) by 189 days.

(21) Appl. No.: 17/315,385

(22) Filed: May 10, 2021

(65) Prior Publication Data

US 2021/0264696 A1    Aug. 26, 2021

Related U.S. Application Data

(63) Continuation of application No. 16/494,296, filed as application No. PCT/IT2018/050039 on Mar. 12, 2018, now abandoned.

(51) Int. Cl.
*G01M 11/06* (2006.01)
*G01S 7/40* (2006.01)
*G07C 5/08* (2006.01)
*G01B 11/27* (2006.01)
*G01S 13/08* (2006.01)

(52) U.S. Cl.
CPC .............. *G07C 5/08* (2013.01); *G01B 11/272* (2013.01); *G01M 11/067* (2013.01); *G01S 7/40* (2013.01); *G01S 13/08* (2013.01)

(58) Field of Classification Search
CPC ...... G07C 5/08; G01B 11/272; G01M 11/067; G01M 11/064; G01S 7/40; G01S 13/08
See application file for complete search history.

(56) References Cited

U.S. PATENT DOCUMENTS

| | | | | |
|---|---|---|---|---|
| 4,647,195 A | * | 3/1987 | Ishikawa | G01M 11/064 356/121 |
| 5,321,439 A | * | 6/1994 | Rogers | H04N 7/181 348/E7.086 |
| 5,504,574 A | * | 4/1996 | Murata | G01M 11/064 356/121 |
| 6,363,619 B1 | * | 4/2002 | Schirmer | G01M 11/067 33/600 |
| 8,897,952 B1 | | 11/2014 | Palmer | |

(Continued)

FOREIGN PATENT DOCUMENTS

CN    2750305 Y  * 1/2006
CN  104994142 A  * 10/2015

(Continued)

OTHER PUBLICATIONS

DE102013019022A1.translate, Karl-Heinz Mittermüller (Year: 2015).*

(Continued)

*Primary Examiner* — B M M Hannan

(57) ABSTRACT

A multifunctional unit for analysis and calibration of devices and components of a vehicle and, in particular, of a motor vehicle, comprising a movable trolley of support; above the movable trolley there is a base, which carries a screen or panel, at the top of which a video projector is placed, suitable for projection of calibration panels used in driver assistance systems of vehicles.

8 Claims, 1 Drawing Sheet

(56) References Cited

U.S. PATENT DOCUMENTS

| | | | |
|---|---|---|---|
| 8,928,869 B2* | 1/2015 | Ekladyous | G01M 11/064 |
| | | | 356/121 |
| 9,008,369 B2* | 4/2015 | Schofield | B60R 1/00 |
| | | | 382/104 |
| 9,896,022 B1* | 2/2018 | Pertsel | B60Q 1/122 |
| 10,086,747 B2* | 10/2018 | Higgins-Luthman | |
| | | | B60Q 1/245 |
| 2003/0133309 A1 | 7/2003 | Seif et al. | |
| 2004/0165174 A1 | 8/2004 | Knoedler et al. | |
| 2005/0027419 A1* | 2/2005 | Horii | B60Q 1/12 |
| | | | 701/49 |
| 2006/0115126 A1* | 6/2006 | Watanabe | G06V 20/58 |
| | | | 382/209 |
| 2006/0115163 A1 | 6/2006 | Nagaoka et al. | |
| 2009/0045323 A1* | 2/2009 | Lu | G06T 7/80 |
| | | | 250/208.1 |
| 2010/0253542 A1* | 10/2010 | Seder | G01S 13/931 |
| | | | 340/425.5 |
| 2012/0224171 A1 | 9/2012 | Yotz et al. | |
| 2013/0058111 A1* | 3/2013 | Ekladyous | G01B 21/24 |
| | | | 362/460 |
| 2013/0110314 A1 | 5/2013 | Stieff | |
| 2013/0226394 A1 | 8/2013 | Amirpour et al. | |
| 2013/0325252 A1 | 12/2013 | Schommer et al. | |
| 2014/0036374 A1 | 2/2014 | Lescure et al. | |
| 2015/0105972 A1 | 4/2015 | Madison et al. | |
| 2015/0233784 A1* | 8/2015 | Ekladyous | G01M 11/061 |
| | | | 348/135 |
| 2015/0241301 A1 | 8/2015 | Wagner | |
| 2017/0129389 A1* | 5/2017 | Asaoka | F21S 41/675 |
| 2017/0203682 A1* | 7/2017 | Atsmon | G06V 10/141 |
| 2017/0315017 A1* | 11/2017 | Ekladyous | G01M 11/065 |
| 2018/0082492 A1* | 3/2018 | Stanek | G07C 5/0808 |
| 2018/0100783 A1 | 4/2018 | Stieff et al. | |
| 2018/0254903 A1 | 9/2018 | Bardelski et al. | |
| 2019/0004147 A1 | 1/2019 | Conrad et al. | |
| 2020/0074767 A1 | 3/2020 | Cavalli | |

FOREIGN PATENT DOCUMENTS

| | | | | |
|---|---|---|---|---|
| DE | 102010033351 A1 * | 2/2012 | | G01M 11/062 |
| DE | 102014016116 | 4/2015 | | |
| DE | 102013019022 | 5/2015 | | |
| DE | 102014016174 | 6/2015 | | |
| DE | 102014016174 A1 * | 6/2015 | | G01M 11/067 |
| DE | 102014016243 A1 * | 6/2015 | | G01M 11/065 |
| EP | 1375249 A1 * | 1/2004 | | B60Q 1/085 |
| EP | 1953520 | 8/2008 | | |
| GB | 2456023 | 7/2009 | | |
| JP | 2008039729 A * | 2/2008 | | |
| JP | 6052770 | 12/2016 | | |
| KR | 101794677 B1 * | 11/2017 | | |
| WO | WO-2007039888 A2 * | 4/2007 | | G01M 11/064 |
| WO | WO 2018/167809 | 9/2018 | | |

OTHER PUBLICATIONS

KR101794677B1.translate (Year: 2017).*
DE102013019022A1.FOR (Year: 2015).*
Communication Pursuant to Article 94(3) EPC dated Apr. 16, 2020 From the European Patent Office Re. Application No. 18716364.7. (6 Pages).
International Search Report and the Written Opinion dated Jun. 27, 2018 From the International Searching Authority Re. Application No. PCT/IT2018/050039. (10 Pages).
Notice of Allowance dated Feb. 24, 2021 From the US Patent and Trademark Office Re. U.S. Appl. No. 16/494,296. (8 Pages).
Official Action dated Nov. 3, 2020 From the US Patent and Trademark Office Re. U.S. Appl. No. 16/494,296. (21 Pages).
Official Action dated Jul. 21, 2020 From the US Patent and Trademark Office Re. U.S. Appl. No. 16/494,296. (30 Pages).

* cited by examiner

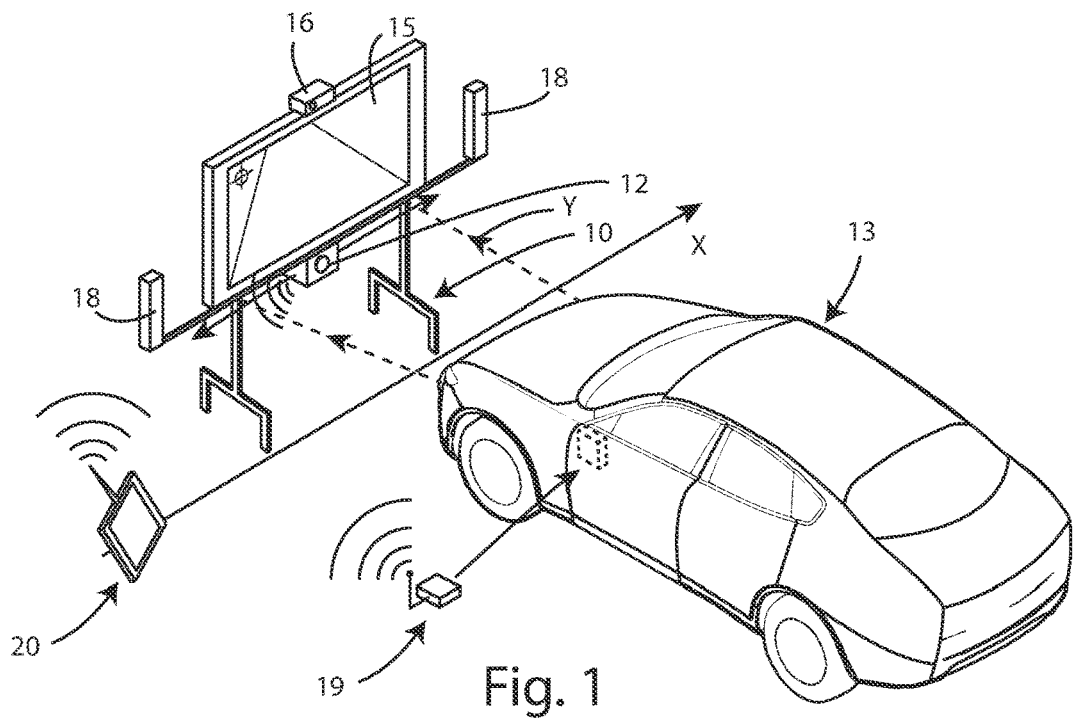
Fig. 1
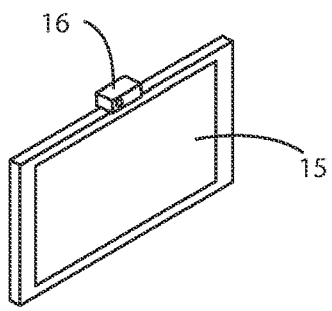
Fig. 2
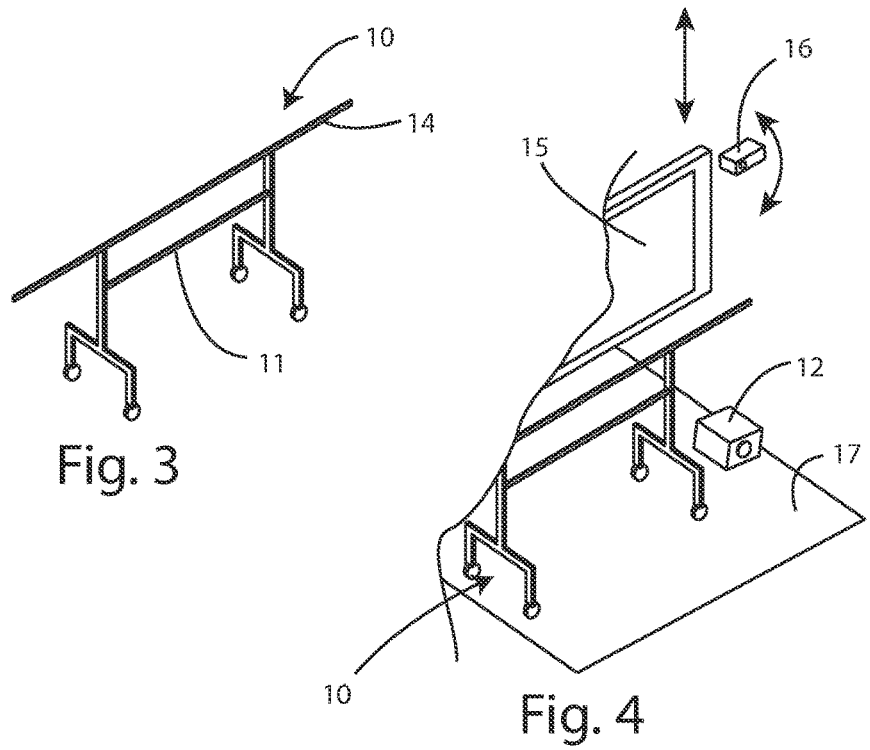
Fig. 3
Fig. 4

MULTIFUNCTIONAL UNIT FOR THE ANALYSIS AND CALIBRATION OF DEVICES AND COMPONENTS OF A VEHICLE

RELATED APPLICATIONS

This application is a Continuation U.S. patent application Ser. No. 16/494,296 filed on Sep. 15, 2019, wh is a National Phase of PCT Patent Application No. PCT/IT2018/050039 having International filing date of Mar. 12, 2018, which claims the benefit of priority of Italian Patent Application No. 102017000028708 filed on Mar. 15, 2017. The contents of the above applications are all incorporated by reference as if fully set forth herein in their entirety.

FIELD AND BACKGROUND OF THE INVENTION

The present invention refers generally to a multifunctional unit for the analysis and calibration of devices and components present in a vehicle and, in particular, in a motor vehicle.

More specifically, the invention relates to a multifunctional unit, which allows solving the problem of replacement, activation, control and calibration of advanced driver assistance systems (A.D.A.S); some specific systems are listed below, as a non-limiting example:

- optical groups of a vehicle, in particular for those of a digital type;
- driver assistance cameras;
- radar for the dynamic management of the speed of a cruise based on the distance from the vehicle ahead;
- infrared sensors to aid parking;
- systems to modulate vehicle speed based on traffic conditions;
- vehicle assisted braking systems to avoid collisions in case of carelessness;
- systems to correct the trajectory of the vehicle if it deviates from the lane.

The multifunctional unit provides the dialogue with the electronic systems, responsible for the control of the functions listed above through a wireless connection with a device connected to the OBD diagnostic port of the vehicle; this is to allow a dialogue, in the operating phase, between the multifunctional unit and the onboard electronic systems.

The multifunction unit is also equipped with a removable display module to proceed with greater convenience to the adjustments to be made.

Till now headlight beam setter devices are known to control the orientation and light intensity of the headlights of a motor vehicle.

A headlight beam setter device essentially comprises a height-adjustable optical group and mounted on a vertical translatable support, which is aligned with the headlight of the motor vehicle, so as to receive the collimated light beam coming from the headlight, without introducing any distortion during the procedures of translation of the support and/or alignment of the optical group.

The above said optical group is formed by a series of lenses suitably shaped in a way to focus the light beam of all types of headlights.

The vertical support brings to its top a mirror or a laser alignment system, which allows the alignment of the device with the longitudinal axis of the motor vehicle.

In particular, in recent times, with the development of Xenon headlights and LED headlights have spread, however, optics particularly sophisticated and optical groups of digital type and for the functional verification of the latter, it is necessary the use of a camera, which frames and digitally processes the obtained image, in order to filter the bright halos around the beam and define a precise direction.

In practice, the light beam coming from the headlight of the motor vehicle is directed, through a suitable optical preparation path, towards a digital camera integrated in the headlight beam setter module available to the user and the image processed in a specific way and in graphic format shows the exact pointing position and the shape of the light beam, which can then be verified and possibly regulated.

The orientation of the vehicle headlight can thus be directed to the correct pointing position.

In most cases, the headlight beam setter devices also include a measuring device of the light beam intensity emitted from both the low beam headlight and high beam headlight of the motor vehicle.

However, the aforesaid devices are designed only for the control and the passive regulation of the headlights, without the possibility of communicating with the control units of the new intelligent optical systems.

This lack of communication prevents a headlight of the type described above from carrying out and completing the adjustment operation correctly.

Furthermore, these systems are aimed solely at the vehicle lighting system and not at other driving support systems.

In fact, for the latter, today it is necessary to use other equipment for a complete control of the whole instrumentation of driving aid of the vehicle.

In particular, it is necessary to use other equipment and other methods for recalibrating the driver assistance systems listed above (the so-called A.D.A.S. systems).

SUMMARY OF THE INVENTION

The object of the present invention is therefore to provide a multifunctional unit for the analysis and calibration of devices and components of a vehicle and in particular of a motor vehicle, which allows to perform various operations of regulation and control of the various systems present in the present vehicles, such as, among others, digital optical group and vehicle driver assistance systems (ADAS systems), using a single multi-purpose structure.

Another object of the present invention is to provide a multifunctional unit for the analysis and calibration of devices and components of a vehicle, which is able to communicate with the vehicle electronic systems to guarantee a simplification of the repair activities, replacement and regulation, for example of optical groups, cameras, radar and infrared and other sensors; the dialogue with the vehicle takes place through an interface inserted in the OBD socket and connected wirelessly to the multifunctional system, so as to allow the reading of useful data (e.g. tire pressure, steering position, etc.) to the adjustments in progress and to allow the activation of special functions necessary to make the adjustments themselves (e.g. switching on a specific area of the LED matrix of the vehicle headlights, activation of the configuration and learning procedure, etc.).

A further object of the present invention is to provide a multifunctional unit for the analysis and calibration of devices and components of a vehicle, which allows proceeding more comfortably to the adjustments to be made, by means of a mobile display unit with wireless connection.

These and other objects are achieved by a multifunctional unit for the analysis and calibration of devices and components of a vehicle and, in particular, of a motor vehicle, according to the attached claim 1; other detailed features of the multifunctional analysis and calibration unit are included in the dependent claims.

BRIEF DESCRIPTION OF THE SEVERAL VIEWS OF THE DRAWINGS

The aforementioned objects and advantages will result to a greater extent from the following description, relating to a preferred embodiment of the multifunctional unit of analysis and calibration, which is the object of the present invention, provided by way of example and by way of non-limiting example, and from the attached drawings, also supplied as indicative and illustrative, but not limitative, in which:

FIG. 1 is a perspective view of a multifunctional unit for the analysis and calibration of devices and components of a vehicle, in use, according to the present invention;

FIGS. 2, 3 and 4 are a series of perspective views of some components of the multi-functional unit of FIG. 1, according to the present invention.

DESCRIPTION OF SPECIFIC EMBODIMENTS OF THE INVENTION

With reference to the aforementioned figures, the multifunctional unit according to the invention consists of a movable trolley 10, such that, it can be positioned around a vehicle or motor vehicle 13 frontally placed to the trolley 10, which may have a guide 11 supporting a headlight beam setter device 12 (such that the headlight beam setter device can be easily installed and removed); in the case in which the guide 11 and the headlight beam setter device 12 are used, the aforementioned headlight beam setter 12 is able to translate according to a direction (axis X) transverse with respect to the direction (Y axis) of pointing of the headlight of the vehicle.

In other embodiments of the invention, the guide 11 can also support a reflecting element for the electromagnetic waves, which can replace or be combined with the headlight beam setter device 12.

The movable trolley 10 has a system of pointing and alignment to the vehicle known per se (such as a laser alignment system), in a way that the headlight beam setter device 12 and/or the reflecting element, if present, are adjustable and positionable along the X-axis and the pointing system can be aligned along the Y axis with the left and right headlights of the vehicle 13.

In practice, the laser alignment system makes it possible to adjust and position the movable trolley 10 and, optionally, the headlight beam setter device 12; in this way, when the headlight beam setter 12 is present, the aforementioned headlight beam setter 12 and the trolley 10 are aligned with each other and form a known and defined angle with the vehicle or motor vehicle 13.

This makes it possible to align the entire integral structure with the self-propelled trolley 10 and, in this way, all the objects applied to the trolley 10 may have a defined and verified geometrical position, relative to the rear, front or lateral parts of the vehicle or motor vehicle 13.

A base 14 is positioned above the trolley 10, which supports a screen or panel 15, at the top of which a video projector 16 is placed, suitable for projecting the calibration tables of the cameras used in the driver assistance systems of the various vehicles and, in general, of all the systems that need "target panels".

In particular, the video projector 16 is of the short-range type with vertically adjustable and angularly adjustable arrangement on at least two positions, so as to project such calibration tables onto screen 15 of the trolley 10 and/or on the floor 17.

The trolley 10 also allows the assembly, in a lateral position, of elements 18 of activation, reference and calibration for the regulation and control of Advanced Driver Assistance Systems (A.D.A.S. systems), such as radar, infrared sensors, etc.

The headlight beam setter device 12, if present, can also be connected to the onboard electronic systems of the vehicle 13 by means of an OBD device 19, installed on board of the vehicle in the OBD diagnostic socket present in the vehicles, which is able to generate univocal data of identification of the vehicle or motor vehicle 13 to be transmitted externally and which is provided with a configurable multiprotocol communication system for bi-directional communication with the electronic systems (control units) installed on board the vehicle or motor vehicle 13.

In particular, the OBD device 19 consents to realize a functional dialogue between the headlight beam setter 12 and the electronic headlight control units of the motor vehicle 13, in order to activate the procedures envisaged for the necessary adjustments.

The connection of the headlight beam setter 12 with the onboard electronic systems therefore enables the headlight beam setter 12 to receive specific information necessary to ensure the correct regulation of the optical groups of the vehicle, such as, for example, by way of example, but not limiting, tire pressure, steering position, battery voltage, etc; in this way, it is possible, for example, to adjust the orientation of the headlight of the motor vehicle 13 automatically, quickly and safely, under ideal conditions.

Still according to the present invention, the headlight beam setter 12 can be equipped with a portable display unit 20 which, at rest, is housed in the headlight beam setter itself, meanwhile, operationally, it can be removed and taken near the engine compartment of the vehicle 13 to proceed more comfortably to the regulations to be made; in this way, in fact, one can have an eye on the effect of the adjustments made on the generation of the light image produced by the headlights of the vehicle 13 and shown on the unit 20.

This opportunity makes it easier and more comfortable, thanks to the mobility of the display unit, all the adjustments and controls of the other A.D.A.S. systems, which are carried out from the passenger compartment of the vehicle 13 and in the driving position.

Thus, using the OBD 19 device, a two-way functional communication takes place between the portable display unit 20 and/or the headlight beam setter device 12 and the electronic control units of the A.D.A.S. systems. in general and in particular of the digital optical groups of the vehicle, in order to activate the procedures required for the necessary adjustments and to ensure a correct configuration, control and regulation procedure of the A.D.A.S. on the vehicle based on additional support parameters such as, for example, vehicle tire pressure, vehicle steering position, battery voltage, etc.

Moreover, according to the invention, the video projector 16 allows to simulate road dynamics, at least for what concerns the functions driven by the cameras of the motor vehicle 13; in practice, the projector 16 allows to project simulation images, such as a video on road or an animation, in order to verify that the alert systems work (for example, for the identification of a passer-by, for the recognition of road signs, etc.).

By virtue of the foregoing, it is understood that the multifunctional unit for the analysis and calibration of devices and components of a vehicle, which is the object of the present invention, achieves the objects and realizes the advantages mentioned.

Finally, it is clear that many other variations may be made to the multifunctional unit in question, without departing from the principles of novelty inherent in the inventive idea expressed herein, as it is clear that, in the practical implementation of the invention, the materials, the shapes and the dimensions of the illustrated details may be any according to the requirements and replaced with other technically equivalent ones.

What is claimed is:

1. A multifunctional unit for analysis and calibration of devices and components of a vehicle, comprising a movable trolley of support, wherein a base is placed above said moveable trolley, which carries a screen or panel, wherein a video projector is placed at the top of said screen or panel, said video projector being configured to project simulation images and/or graphic images representing panels of calibration used for regulation and control of driver assistance systems.

2. The multifunctional unit according to claim 1, wherein said movable trolley has a guide, for supporting a headlight beam setter device, said guide being adapted for translating in a direction transverse to a direction of pointing headlights of a vehicle placed frontally to said movable trolley, said base carrying said screen or panel being placed above said guide.

3. The multifunctional unit according to claim 2, wherein said headlight beam setter device has a pointing and alignment system to said vehicle, which allows adjusting and position said headlight beam setter device and said movable trolley, so that they are aligned with each other and forming a known and defined angle with said vehicle.

4. The multifunctional unit according to claim 2, wherein the headlight beam setter device is connected to an On-Board Diagnostics (OBD) device, installed on board of the vehicle in a specific OBD diagnostic socket.

5. The multifunctional unit according to claim 1, wherein said movable trolley being adapted to support installation of elements of activation, reference and calibration for regulation and control of said driver assistance systems.

6. The multifunctional unit according to claim 1, wherein said multifunctional unit uses a portable display unit which is connected to an On-Board Diagnostics (OBD) device installed on board of the vehicle in a specific OBD diagnostic socket.

7. The multifunctional unit according to claim 6, wherein said movable trolley has a guide, for supporting a headlight beam setter device, wherein said portable display unit, when at rest, is housed in the headlight beam setter device.

8. The multifunctional unit according to claim 1, wherein said video projector having adjustable disposition on at least two positions, so as to project said panels of calibration on said screen or panel of the movable trolley and/or on a ground or on a floor.

* * * * *

UNITED STATES PATENT AND TRADEMARK OFFICE
CERTIFICATE OF CORRECTION

| | | |
|---|---|---|
| PATENT NO. | : 11,837,035 B2 | Page 1 of 1 |
| APPLICATION NO. | : 17/315385 | |
| DATED | : December 5, 2023 | |
| INVENTOR(S) | : Manuele Cavalli | |

It is certified that error appears in the above-identified patent and that said Letters Patent is hereby corrected as shown below:

On the Title Page

Insert the following:
Item (30) Foreign Application Priority Data
-- Mar. 15, 2017 (IT)................................................ 102017000028708 --

Signed and Sealed this
Twenty-first Day of January, 2025

Coke Morgan Stewart
*Acting Director of the United States Patent and Trademark Office*